United States Patent
Jordan et al.

[11] Patent Number: 5,872,535
[45] Date of Patent: Feb. 16, 1999

[54] REMOVING BUOY MOTION FROM WIND PROFILER MOMENT

[75] Inventors: James R. Jordan, Boulder; Richard J. Lataitis, Highlands Ranch, both of Colo.

[73] Assignee: National Oceanic & Atmos Admin, Boulder, Colo.

[21] Appl. No.: 940,875

[22] Filed: Sep. 30, 1997

[51] Int. Cl.$^6$ ................................................ G01S 13/95
[52] U.S. Cl. ........................... 342/26; 342/161; 342/192; 342/196
[58] Field of Search .............................. 342/26, 460, 159, 342/161, 192, 196

[56] References Cited

U.S. PATENT DOCUMENTS

| | | | |
|---|---|---|---|
| 3,387,491 | 6/1968 | Adams | 73/189 |
| 3,751,984 | 8/1973 | Rennie | 73/863.01 |
| 4,054,879 | 10/1977 | Wright et al. | 342/192 |
| 4,331,037 | 5/1982 | Du Vall | 73/861.09 |
| 4,394,825 | 7/1983 | Du Vall | 73/861.09 |
| 4,515,013 | 5/1985 | Hue | 73/170.01 |
| 5,122,805 | 6/1992 | Peterman et al. | 342/26 |
| 5,440,309 | 8/1995 | Moreira et al. | 342/25 |
| 5,469,250 | 11/1995 | Holmes | 356/28 |
| 5,568,151 | 10/1996 | Merritt | 342/192 |
| 5,592,171 | 1/1997 | Jordan | 342/26 |
| 5,686,919 | 11/1997 | Jordan et al. | 342/26 |
| 5,689,444 | 11/1997 | Jordan et al. | 364/554 |

*Primary Examiner*—John B. Sotomayor
*Attorney, Agent, or Firm*—Robert Platt Bell & Associates, P.C.

[57] ABSTRACT

The present invention provides an apparatus and method for correcting buoy motion in Doppler moment estimates. In the present invention, it is assumed that the buoy is stationary over short periods of time, 0.5 seconds for example. The average pitch and roll angles are measured for the 0.5 second period. A short-term Doppler spectrum for a particular beam is computed and stored along with the corresponding average pointing angle. This short-term Doppler spectrum must be averaged with many others to be able to detect the clear air signal. To correct for motion broadening, the present invention shifts each short Doppler spectrum some number of velocity bins before averaging them together. This shifting scales the measured radial velocity at some measured pointing angle to the radial velocity that would have been measured if the antenna was pointing at some initial pointing angle, typically the steering angle if the antenna was level. The wind velocity derived from the average 30 second Doppler spectrum without shifting is used as a first guess. The equations are solved iteratively until spectral width is minimized.

15 Claims, 6 Drawing Sheets

Doppler Radial Velocity (m/sec)

REMOVING BUOY MOTION FROM WIND PROFILER MOMENT

STATEMENT OF GOVERNMENT INTEREST

The subject matter of the present application was developed using government funds. The U.S. Government, if not owner of the present invention, has a paid-up license in this invention and the right in limited circumstances to require the patent owner to license others on reasonable terms.

FIELD OF THE INVENTION

The present invention relates to the use of radar, particularly Doppler radar, in measuring wind profiles. In particular, the present invention is related to a method and apparatus for removing, from a Doppler radar signal, components generated due to motion of the radar platform.

BACKGROUND OF THE INVENTION

Techniques for measuring wind velocity and direction using so-called Doppler radar are well known in the art. Atlas, U.S. Pat. No. 4,649,388, issued Mar. 10, 1987 and incorporated herein by reference, discloses one such Doppler radar for measuring low level wind shear. The problem of wind shear in aviation is well known, and application of such Doppler radars for measuring and detecting wind shear is well known in the art.

However, such radar systems may also be adapted for other uses as well. For example, measurement of wind velocities and directions at various altitudes may be useful in researching weather patterns, measuring air pollution, and the like. Jordan, U.S. Pat. No. 5,592,171 issued Jan. 7, 1997, and incorporated herein by reference, discloses such a wind profiling radar. The Jordan system provides a method for reducing the amplitude of a radar return signal from the ground and other sources of "clutter"; reflections from the ocean surface, birds, airplanes, and precipitation.

Such systems are also described in Clifford et al., *Ground-Based Remote Profiling in Atmospheric Studies: An Overview*, PROCEEDINGS OF THE IEEE, Vol. 82, No. 3, March 1994, also incorporated herein by reference.

In some instances, it may be desirable to mount such Doppler radar systems on moving platforms. For example, to measure weather patterns or detect wind shear over an ocean area, it may be desirable to mount a Doppler radar antenna on a ocean buoy or the like. Such a buoy mounting may be desirable to measure movement of pollution over the water, or for detecting wind movement near an ocean- or lake-side airport.

In addition, there may be other applications where a Doppler antenna maybe subject to movement, either intentionally or unintentionally. For example, an antenna may be mounted on a ship or airplane for measuring wind and weather patterns. In the prior art, it is known to provide gimbaled antenna systems for maintaining an antenna in a predetermined position regardless of vehicle movement. However, such antenna systems are cumbersome, expensive and heavy, which may be a disadvantage particularly in small craft (boats) and aircraft.

Moreover, such gimabaling systems may only provide motion compensation for a limited range of movements. In heave seas or other rough conditions or movements (e.g., sudden turn in small boat or airplane) such a system may not be able to compensate, and the antenna may run against the "stops" of the gimbal.

In other applications, it may be intended to maintain an antenna stationary, however, other factors may cause some slight movement in the antenna. For example, a tower-mounted antenna may tend to sway in the wind, introducing artifacts in a received signal.

When operating a wind profiler on a buoy (or any moving platform) motion of the buoy or platform produces spectral broadening. A wind profiler requires about 30 seconds of averaging time to reduce noise variance enough to detect a clear air signal. A buoy, for example, can sway back and forth through several cycles during a 30 second averaging time.

Buoy motion during the averaging time will broaden the clear air peak in the Doppler spectrum causing errors in the measured power (zeroth moment) radial velocity (first moment) and spectral width (second moment). Buoy motion is slow enough that it can be assumed to be negligible for a short time. Unfortunately, the time the buoy position can be assumed to be fixed does not in general allow enough averaging to detect the clear air signal in the Doppler spectrum.

SUMMARY OF THE INVENTION

The present invention provides an apparatus and method for correcting buoy motion in Doppler moment estimates. In the present invention, it is assumed that the buoy is stationary over short periods of time, 0.5 seconds for example. The average pitch and roll angles are measured for the 0.5 second period. A short-term Doppler spectrum for a particular beam is computed and stored along with the corresponding average pointing angle. This short-term Doppler spectrum must be averaged with many others to be able to detect the clear air signal.

As the profiler sways with the wave motion, the first moment (i.e., radial velocity) of the spectrum changes because the projection of the horizontal wind along the beam changes. Without correction, the averaging process will broaden the clear air peak and cause error in the estimates of the zeroth, first, and second moments.

To correct for motion broadening, the present invention shifts each short Doppler spectrum some number of velocity bins before averaging them together. This shifting scales the measured radial velocity at some measured pointing angle to the radial velocity that would have been measured if the antenna was pointing at some initial pointing angle, typically the steering angle if the antenna was level.

The technique requires knowledge of the horizontal wind velocity. The wind velocity derived from the average 30 second Doppler spectrum without shifting is used as a first guess. The equations are solved iteratively until spectral width is minimized.

BRIEF DESCRIPTIONS OF THE DRAWINGS

DETAILED DESCRIPTION OF THE INVENTION

Figure 1:
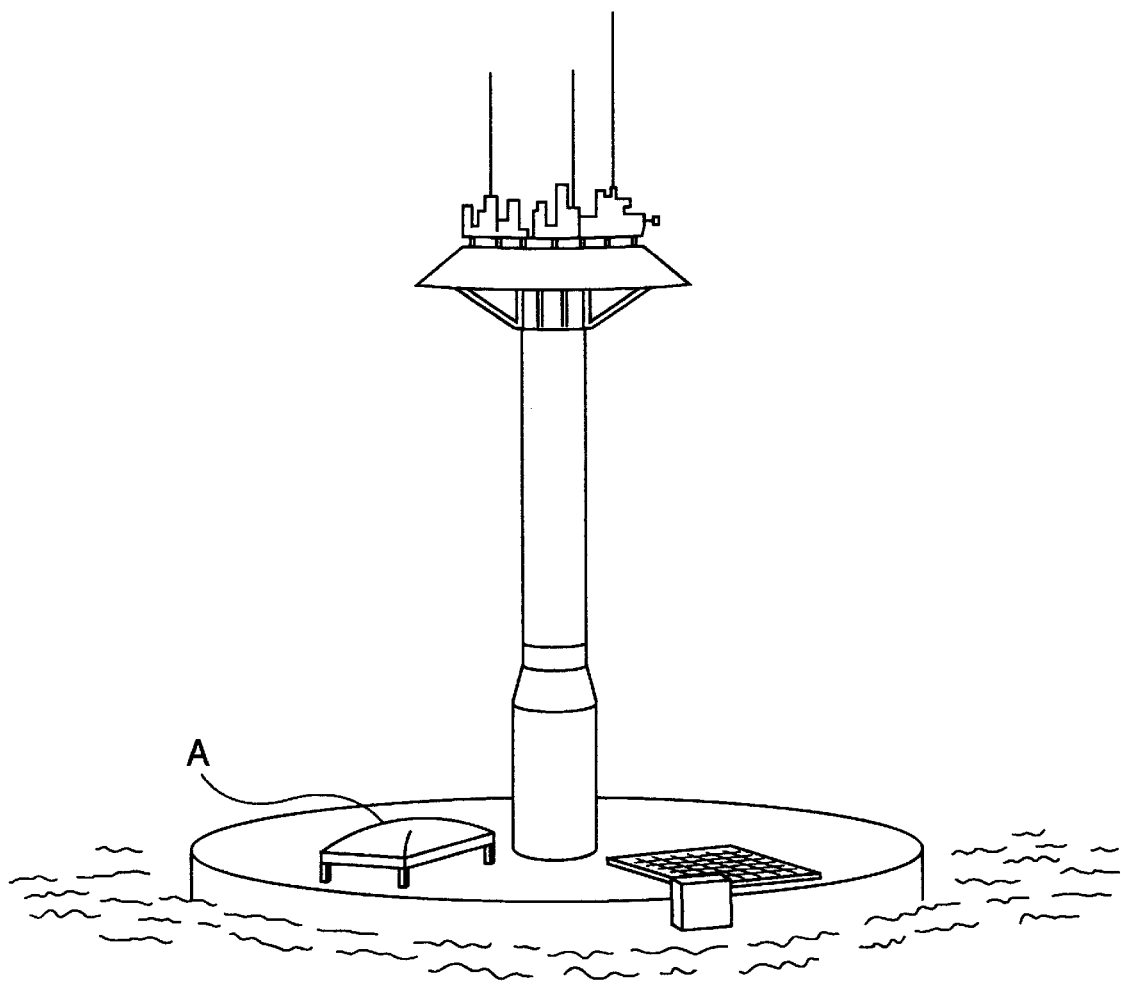
FIG. 1 is a diagram illustrating a doppler radar mounted on an ocean buoy.

The preferred embodiment and best mode of the present invention is contemplated as an apparatus and method for a correcting for buoy motion in Doppler moment estimates. FIG. 1 illustrates a Doppler radar mounted on an deep ocean buoy. Such radar devices are presently used to study wind and weather behavior in off-shore areas. Wind movement off-shore has not been extensively studied, and such studies hope to map wind movement and movement of pollutants in the atmosphere.

The deep ocean buoy of FIG. 1 is approximately 10 meters in diameter and may comprise one of the known deep ocean buoys used previously for ocean weather stations, radar platforms, and the like. Antenna A may comprise a phased-array antenna or the like (as is known in the art), and may be approximately six feet square. Such phased array antennas are known in the art and may be directionally tuned using beam steering techniques for both send and receive modes. Individual elements in the phased array may be provided with selectively alterable time or phase delays to as to "steer" the send or receive beam in a particular direction.

The description of the preferred embodiment of the present invention is characterized in terms of buoy motion. However, as is envisioned by the inventors, and as can be appreciated by one of ordinary skill in the art, the present invention may also be successfully applied to other apparatus using antenna which are mounted on moving platforms. The detailed description of the present invention in the buoy environment should in no way be construed as limiting the present invention to such an environment.

Moreover, the detailed description of the present invention in the environment of doppler radar and wind profiling should not be construed as limiting the present invention to such applications. The present invention may be equally applied to other types of radars and antenna and signal systems.

Figure 2:
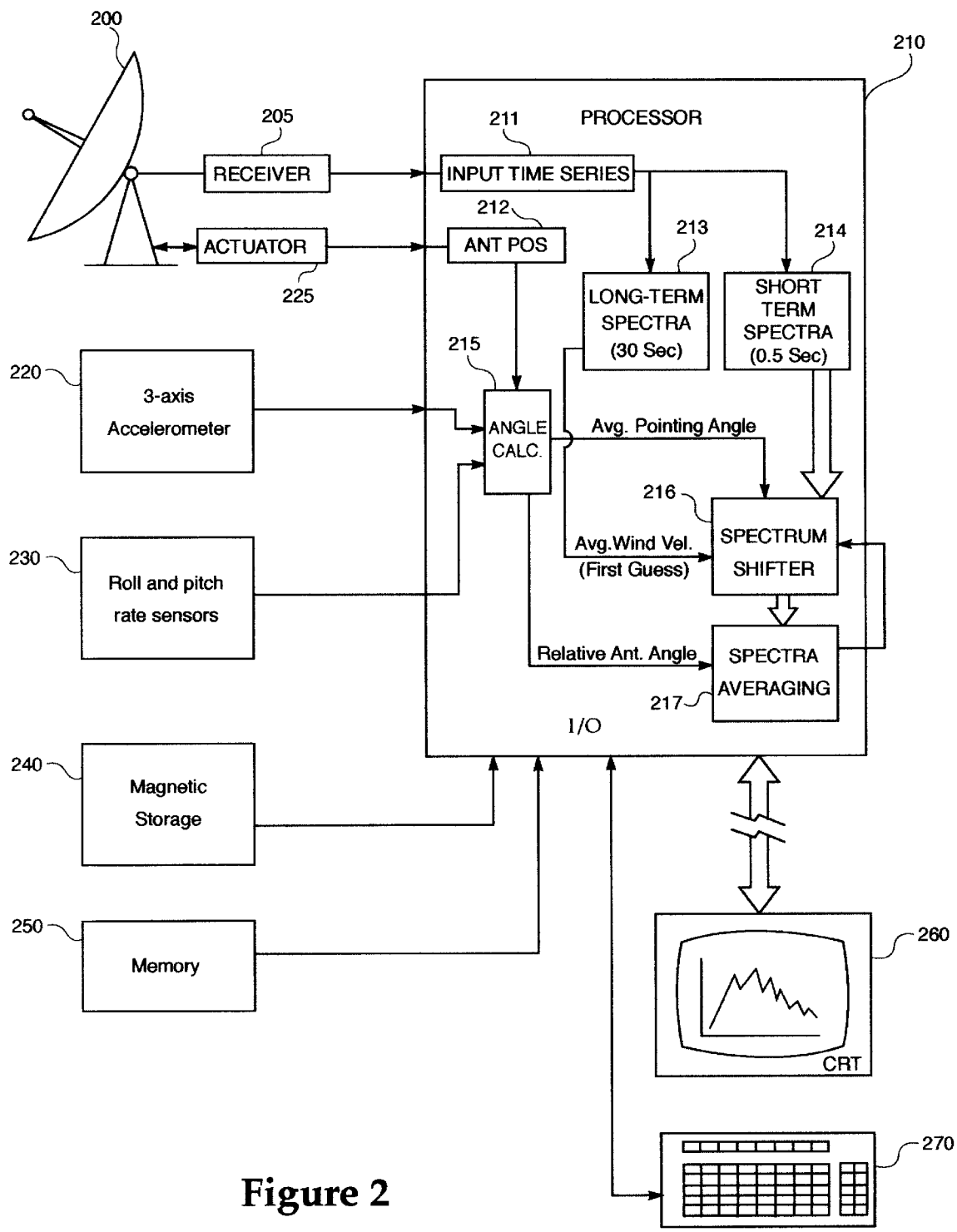
FIG. 2 is a block diagram illustrating the components of the present invention.
Figure 3:
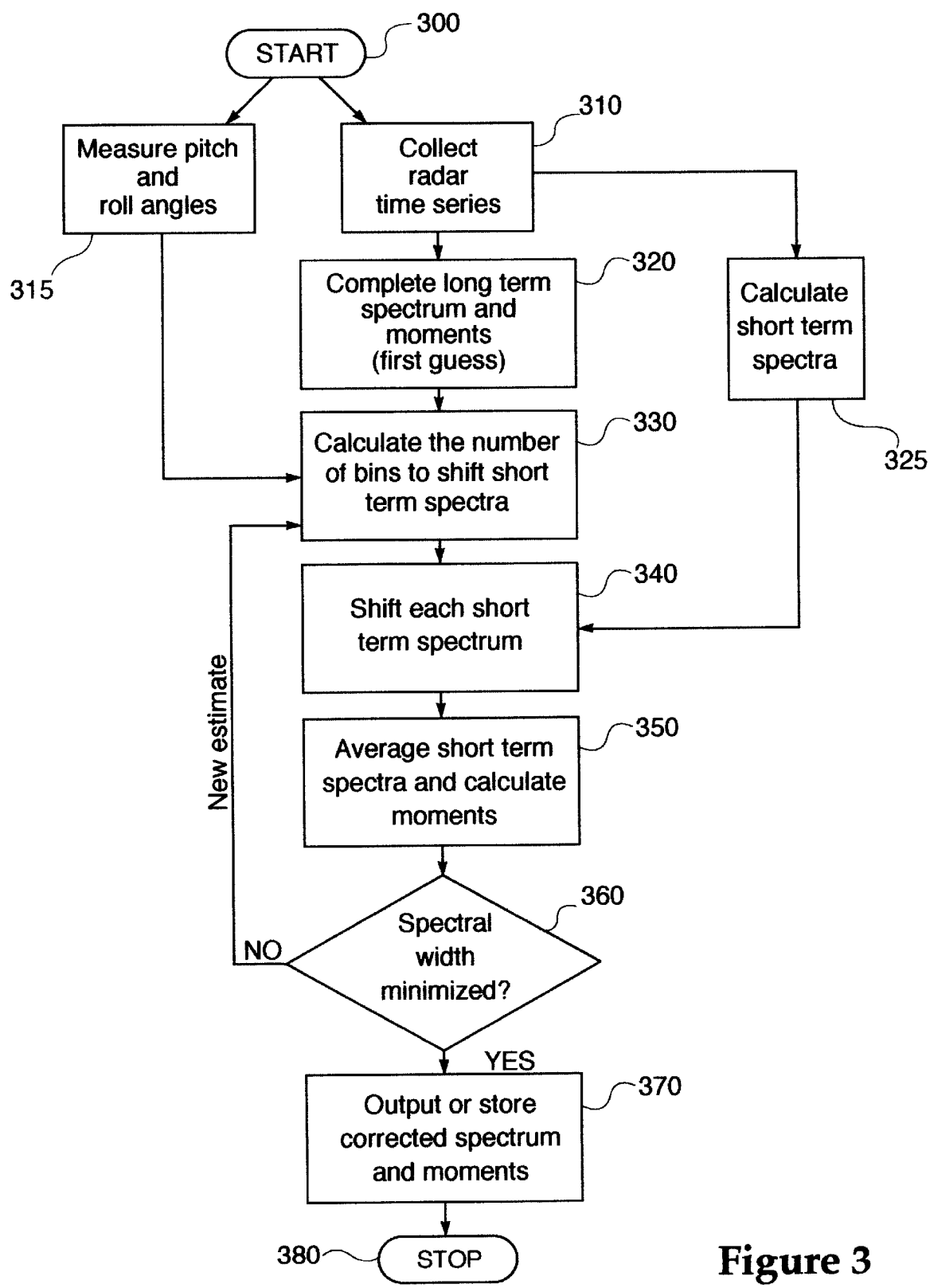
FIG. 3 is a flowchart illustrating the processing steps of the present invention.

In the present invention, it is assumed that buoy 100 is relatively stationary over short periods of time, for example, 0.5 seconds. Other assumed stationary times may be used depending upon the size and shape (and sway period) of a buoy or other moving platform. FIG. 2 is a block diagram illustrating the major components of the present invention. FIG. 3 is a flowchart illustrating the processing steps of the present invention. The processing steps of FIG. 3 and the components of FIG. 2 may be implemented in computer systems and standard instrumentation known in the art.

For example, in FIG. 2, processor 210 may comprise any one of a number of know processor devices. Data produced by processor 210 may be stored in memory 250 (e.g., DRAM, EEPROM, flash memory or the like) or in magnetic storage device 240 (hard disk drive, tape drive, or the like). In a buoy embodiment, accumulated wind profile data may be stored in devices 240 and/or 250 and later read out when the buoy is retrieved or visited, or via radio link or the like (not shown).

Data may also be displayed on display 260 via keyboard I/O 270 (keyboard, mouse, or the like). Such a display may be useful for land-based applications, or in troubleshooting a buoy mounted device. Moreover, data retrieved from devices 240 and/or 250 may be loaded onto another computer or processor 210 and displayed locally on display 260 via keyboard I/O 270.

In the preferred embodiment, processor 210 may comprise a computer or the like, and elements 211, 212, 213, 214, 215, 216, and 217 within processor 210 may comprise software modules or the like. However it is within the spirit and scope of the present invention to provide as discrete hardware devices any of elements 211, 212, 214, 215, 216, and 217 of processor block 210.

Referring now to FIGS. 1–3, processing of data in the present invention starts at START step 300. 3-axis accelerometer 220 and roll-rate sensor 230 may provide position information to indicate the relative position of buoy 100 to baseline horizontal position. Alternately, suitable inclinometers or the like may also be used to measure relative angle of buoy 100 to horizontal. Average pitch and roll angles of buoy 100 may be measured for a 0.5 second period in averaging block 217 as illustrated in step 315.

Reflected power from antenna 200 is received by receiver 205 and fed to time series input 211 where they are collected as illustrated in step 310. Antenna 200 is illustrated schematically in FIG. 2 as a dish antenna with an electromechanical dish mover (actuator) 225. However, as noted above in connection with FIG. 1, in the preferred embodiment, antenna 200 may comprise a phased array antenna whose "direction" may be controlled through beam steering techniques rather than mechanical actuation.

As illustrated in step 325, a short-term Doppler spectrum for a particular beam is computed in block 214 and stored along with the average pointing angle from average angle calculator 215. The short-term Doppler spectrum may then be averaged with many others to be able to detect a clear air signal. Simultaneously, in step 320, long term spectrum and moments (e.g., a first guess) may be calculated.

As the profiler sways with the wave motion, the first moment (i.e., the average position) of the spectrum changes because the projection of the horizontal wind along the beam changes. Without correction, the averaging process will broaden the clear air peak and cause error in the estimates of the zeroth, first, and second moments.

Figure 4:
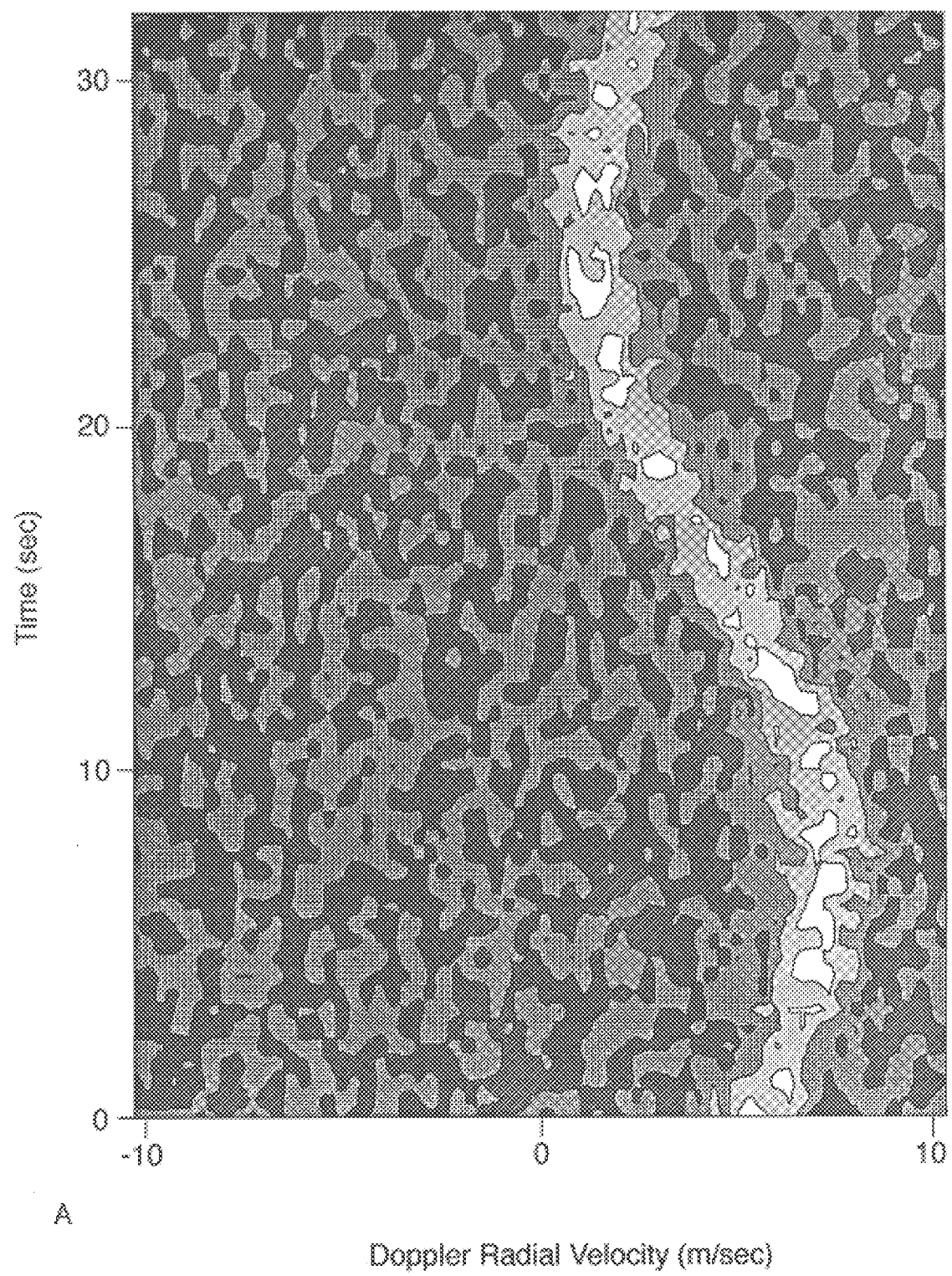
FIG. 4 is a graph illustrating raw power spectra for a received signal without buoy motion compensation.

FIG. 4 is a simulated example of a 30 second time period with Doppler spectra that change in time as the buoy moves through a 15 degree roll. The peak in each spectrum is visible as the white band in the plot. The simulation used to generate the spectra of FIG. 4 uses a large signal-to-noise ratio for clarity and for purposes of illustration. In actual data, the individual peaks my not be visible until the spectra are averaged.

To correct for motion broadening, spectrum shifter 216 first calculates the number of bins to shift the short term spectra in step 330 based upon the first guess from step 320 and the pitch and roll angles from step 315. In step 340, each short Doppler spectrum is shifted the calculated number of velocity bins before they are averaged together in spectrum averager 217 as illustrated in step 350. The shifting of step 340 scales the measured radial velocity at some measured pointing angle to the radial velocity that would have been measured if the antenna was pointing at some initial pointing angle, typically the steering angle if the antenna was level (i.e., horizontal baseline position).

A long-term average Doppler spectrum, computed in block 213 as illustrated in step 320, generates a first guess as to wind velocity. In the preferred embodiment, the long-term average Doppler spectrum is averaged over 30 seconds. However, other time bases for the long-term average Doppler spectrum may be used without departing from the spirit and scope of the present invention.

The equations illustrated herein for generating a clear air spectrum are then solved iteratively in steps 330 through 360 until spectral width is minimized. Once spectral width is minimized, as illustrated in step 360, data may then be output to display 260, or stored in devices 240 or 250 for later data retrieval and processing stops in step 370.

Figure 5:
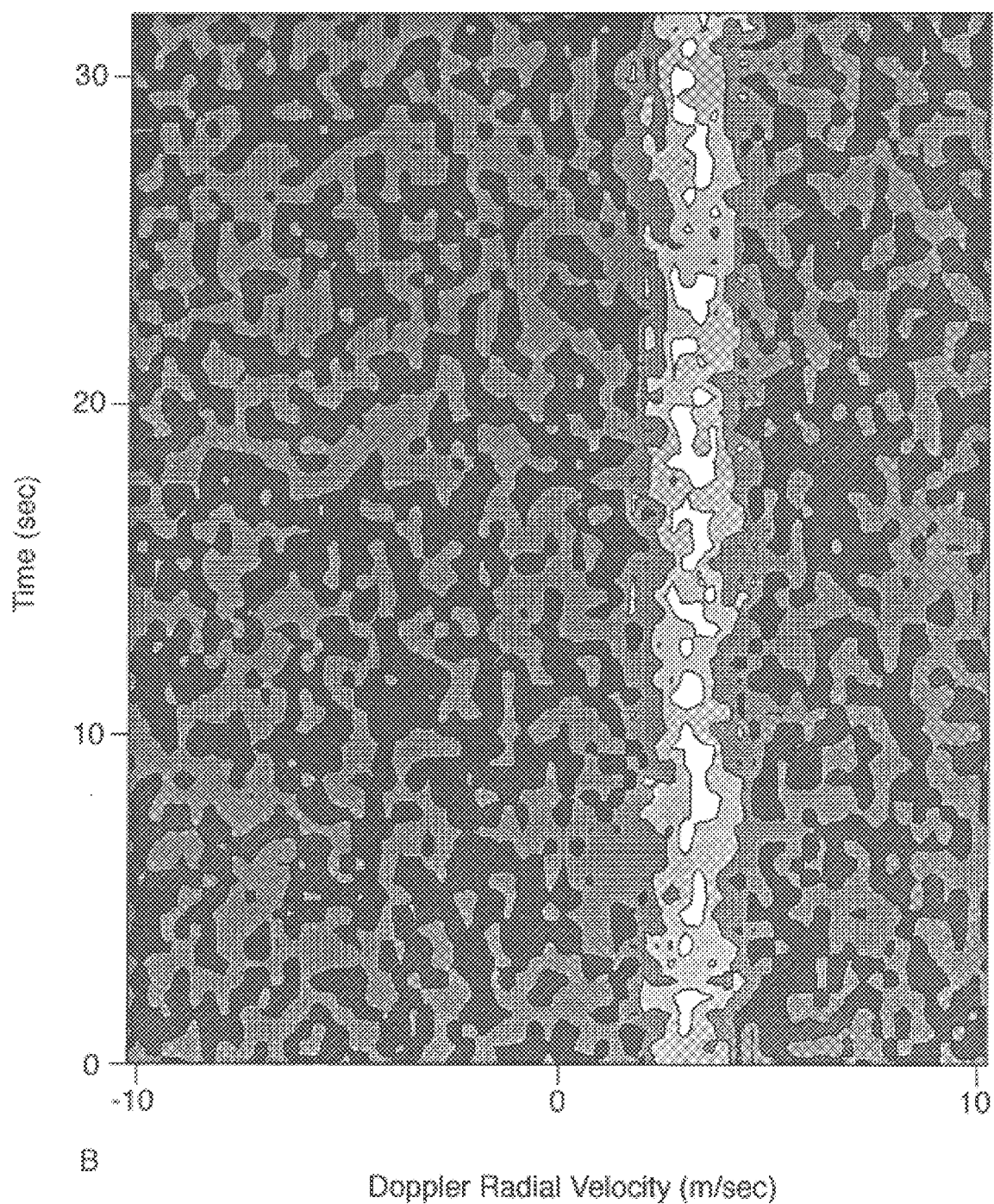
FIG. 5 is a graph illustrating power spectra for a received signal with buoy motion compensation.
Figure 6:
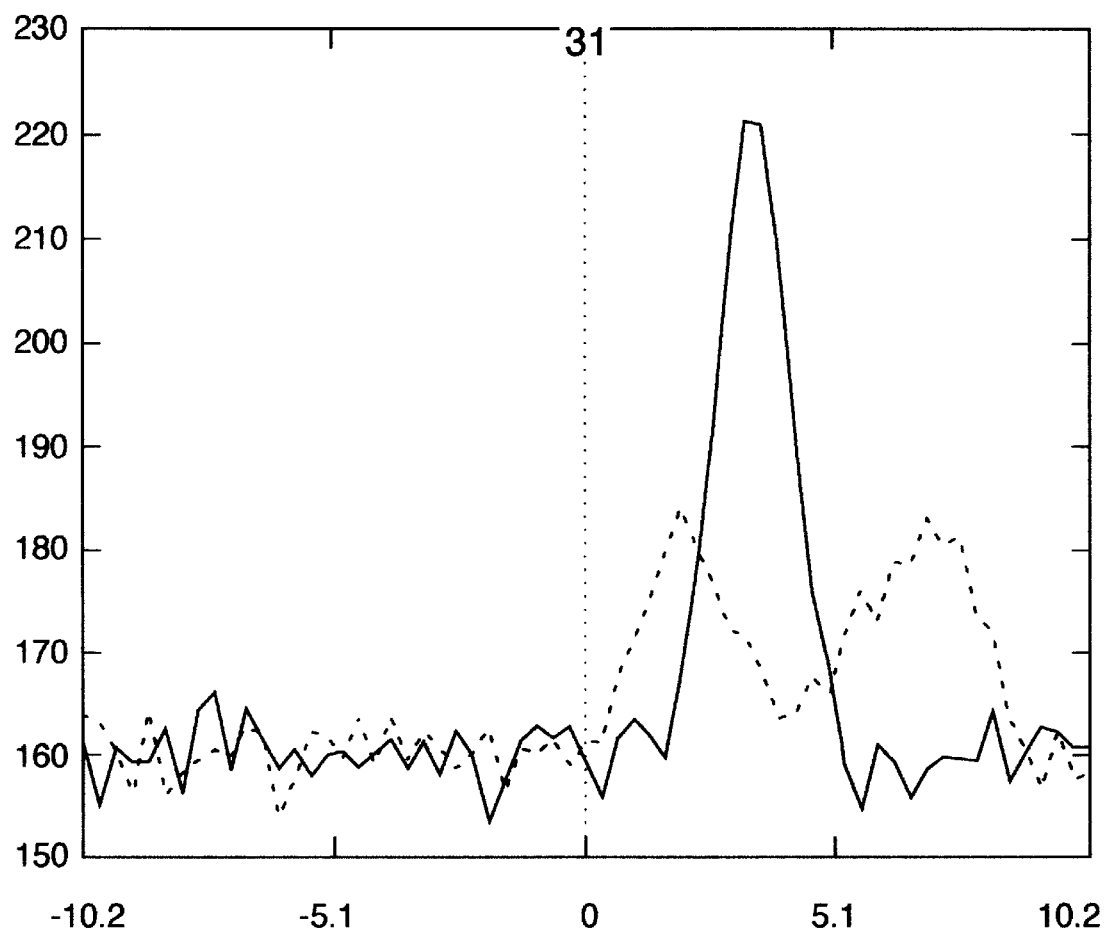
FIG. 6 is a graph of the averaged spectra before correction (dotted line) and after correction (solid line).

FIG. 5 illustrates the spectra of FIG. 4 after such iterative processing with the motion components removed. Compared to FIG. 4, the white band is now straight up the plot, illustrating that the buoy motion has been corrected for. FIG. 6 is a graph of the averaged spectra before correction (dotted line) and after correction (solid line). The uncorrected peak has been smeared in velocity and actually appears as two peaks. The corrected peak is at the correct velocity and has the spectral velocity width preserved.

The individual short-term spectra for an individual beam are shifted by an amount (in velocity space):

$$\Delta v = v_f - v_i \quad \text{EQ. 1}$$
$$= u(\sin\Theta_f \cos\Phi_f - \sin\Theta_i \cos\Phi_i) +$$
$$v(\sin\Theta_f \cos\Phi_f - \sin\Theta_i \cos\Phi_i)$$
$$w(\cos\Theta_f - \cos\Phi_i)$$

Where the subscripts f and i identify the measured final angle and the initial beampointing angles (in spherical coordinates) respectively, and $v_i$ is the 30 second average radial velocity observed by the beam of interest corresponding to the 30 s wind estimate (u, v, w). The final angles in spherical coordinates $(\Theta_f, \Phi_f)$ can be expressed in terms of the measured pitch and roll angles $(\alpha_m, \beta_m)$:

$$\Theta_f = \sin^{-1}[\sqrt{\sin^2(\alpha_i + \alpha_m) + \sin^2(\beta_i + \beta_m)}\,] \quad \text{EQ. 2}$$

$$\phi_f = \tan^{-1}\left[\frac{\sin(\alpha_i + \alpha_m)}{\sin(\beta_i + \beta_m)}\right] \quad \text{EQ. 3}$$

where $$\alpha_i = \sin^{-1}(\sin\Theta_i \sin\Phi_i) \quad \text{EQ. 4}$$

$$\beta_i = \sin^{-1}(\sin\Theta_i \Phi \cos\Phi_i) \quad \text{EQ. 5}$$

are the pitch and roll angles corresponding to the initial beampointing angle $(\Theta_i, \phi)$. After applying the shift to each beam and then averaging the shifted spectra, a new estimate of the horizontal wind is calculated. The whole procedure is repeated until the spectral widths are minimized.

This process requires measurement of the buoy motion and significant spectral calculations. The initial beam pointing angles are constant so any term with a subscript of i can be calculated once and the results stored reducing the computational overhead. For real-time operation, a DSP chip dedicated to solving these equations may be required.

The measured Doppler spectrum in processor 210 is a digital representation of a continuous spectrum. Typically, a 64 point spectra may be used in a Doppler radar. Each of these 64 points may be referred to as a velocity bin and each bin is typically 0.3 m/sec wide in velocity. The average angle calculator 215 along with 3-axis accelerometer 220 and roll-rate sensor 230 may provide pitch and roll angles of the buoy. Using equations 2 and 3 above, these pitch and roll angles may be converted into spherical coordinates.

The spherical coordinates are used along with the first guess of u (the East-West component of the wind), v (the North-South component of the wind), and w (the vertical component of the wind) to solve equation 1. The amount of velocity error that the Doppler spectrum has is given by $\Delta v$. To remove this error, $\Delta v$ needs to be subtracted from the Doppler spectrum. Subtracting $\Delta v$ is accomplished by calculating how many 0.3 m/sec increments are in $\Delta v$ (since the Doppler bins are 0.3 m/sec in this example) and then shifting the spectrum that number of bins to remove the error.

Since the Fourier transform is defined on an interval and is periodic, bins that are shifted off the end are placed in the empty bin at the opposite end. Thus, although described here as shifting bins, the term "rotation" may better describe such a process. This rotation process may cause a small amount of error since any $\Delta v$ value will probably not be an integer number of 0.3 m/sec. The spectra could be interpolated between points and shifted a precise $\Delta v$, but such calculation overhead may not be worth the incremental increase in accuracy.

While the preferred embodiment and various alternative embodiments of the invention have been disclosed and described in detail herein, it may be apparent to those skilled in the art that various changes in form and detail may be made therein without departing from the spirit and scope thereof.

What is claimed is:

1. A method of removing buoy motion from wind profiler moment, comprising the steps of:

a. collecting a radar time series from a radar antenna, b. measuring pitch and roll angles of the radar antenna during collection of the radar time series and calculating an average antenna pointing angle, c. computing, from the radar time series, a long term spectrum and first guess wind profile moment, d. computing, from the radar time series, a plurality of short term spectra, e. calculating, based upon the first guess and the average antenna pointing angle, a number of bins to shift the plurality of short term spectra, f. shifting each short term spectra by the number of bins, g. averaging the plurality of short term spectra to produce an averaged short term spectra, h. calculating wind profile moment from the averaged short term spectra, i. calculating whether the averaged short term spectra is minimized, j. if the averaged short term spectra is not minimized, using the calculated wind profile moment from the averaged short term spectra as a next guess and calculating, based upon the next guess and the measured pitch and roll angles, a number of bins to shift the plurality of short term spectra and repeating steps f through i, k. if the averaged short term spectra is minimized, outputting the average short term spectra as wind profile moment data corrected for buoy motion.

2. The method of claim 1, wherein individual short-term spectra of the plurality of short term spectra are shifted by an amount (in velocity space):

$$\Delta v = v_f - v_i = u(\sin\Theta_f \cos\Phi_f - \sin\Theta_i \cos\Phi_i) + v(\sin\Theta_f \cos\Phi_f - \sin\Theta_i \cos\Phi_i) + w(\cos\Theta_f - \cos\Phi_i)$$

where subscripts f and i identify, in spherical coordinates, measured final angle of the antenna and initial beam-pointing angle of the antenna, respectively, and $v_i$ is a long term average radial velocity observed by the beam of interest corresponding to the long term wind spectrum (u, v, w).

3. The method of claim 2, wherein the average antenna pointing angle in spherical coordinates $(\Theta_f, \Phi_f)$ is expressed in terms of the measured pitch and roll angles $(\alpha_m, \beta_m)$:

$$\Theta_f = \sin^{-1}[\sqrt{\sin^2(\alpha_i + \alpha_m) + \sin^2(\beta_i + \beta_m)}\,]$$

-continued $$\phi_f = \tan^{-1}\left[\frac{\sin(\alpha_i + \alpha_m)}{\sin(\beta_i + \beta_m)}\right]$$

where $\alpha_i = \sin^{-1}(\sin \Theta_i \sin \Phi_i)$ $\beta_i = \sin^{-1}(\sin \Theta_i \Phi \cos \Phi_i)$ are pitch and roll angles corresponding to an initial beam-pointing angle ($\Theta_i$, $\phi$).

4. A method of removing antenna motion generated components from radar data, comprising the steps of:
  collecting a radar time series from a radar antenna,
  measuring pitch and roll angles of the radar antenna during collection of the radar time series,
  computing a long term spectrum from the radar time series for use as a first guess of averaged short term spectra,
  iteratively computing, from the radar time series, a plurality of short term spectra, shifting the short term spectra based upon the averaged short term spectra and the measured pitch and roll angles, and averaging the plurality of short term spectra to produce an averaged short term spectra, and iterating using the averaged short term spectra from a previous iteration until the average short term spectra is minimized.

5. The method of claim 4, wherein individual short-term spectra of the plurality of short term spectra are shifted by an amount (in velocity space):

$\Delta v = v_f - v_i = u(\sin \Theta_f \cos \Phi_f - \sin \Theta_i \cos \Phi_i) + v(\sin \Theta_f \cos \Phi_f - \sin \Theta_i \cos \Phi_i) + w(\cos \Theta_f - \cos \Phi_i)$ where subscripts f and i identify, in spherical coordinates, measured final angle of the antenna and initial beam-pointing angle of the antenna, respectively, and $v_i$ is a long term average radial velocity observed by the beam of interest corresponding to the long term wind spectrum (u, v, w).

6. The method of claim 5, wherein the average antenna pointing angle in spherical coordinates ($\Theta_f$, $\phi_f$) is expressed in terms of the measured pitch and roll angles ($\alpha_m$, $\beta_m$):

$$\Theta_f = \sin^{-1}[\sqrt{\sin^2(\alpha_i + \alpha_m) + \sin^2(\beta_i + \beta_m)}\ ]$$

$$\phi_f = \tan^{-1}\left[\frac{\sin(\alpha_i + \alpha_m)}{\sin(\beta_i + \beta_m)}\right]$$

where $\alpha_i = \sin^{-1}(\sin \Theta_i \sin \Phi_i)$ $\beta_i = \sin^{-1}(\sin \Theta_i \Phi \cos \Phi_i)$ are pitch and roll angles corresponding to an initial beam-pointing angle ($\Theta_i$, $\phi$).

7. An apparatus for removing antenna motion components from radar data comprising:
  means for collecting a radar time series from a radar antenna;
  means for measuring pitch and roll angles of the radar antenna during collection of the radar time series;
  means for computing a long term spectrum from the radar time series for use as a first guess of averaged short term spectra; and
  means for iteratively computing, from the radar time series, a plurality of short term spectra, shifting the short term spectra based upon the averaged short term spectra and the measured pitch and roll angles, and averaging the plurality of short term spectra to produce an averaged short term spectra, and iterating using the averaged short term spectra from a previous iteration until the average short term spectra is minimized.

8. The apparatus of claim 7, wherein individual short-term spectra of the plurality of short term spectra are shifted by an amount (in velocity space):

$\Delta v = v_f - v_i = u(\sin \Theta_f \cos \Phi_f - \sin \Theta_i \cos \Phi_i) + v(\sin \Theta_f \cos \Phi_f - \sin \Theta_i \cos \Phi_i) + w(\cos \Theta_f - \cos \Phi_i)$ where subscripts f and i identify, in spherical coordinates, measured final angle of the antenna and initial beam-pointing angle of the antenna, respectively, and $v_i$ is a long term average radial velocity observed by the beam of interest corresponding to the long term wind spectrum (u, v, w).

9. The apparatus of claim 8, wherein the average antenna pointing angle in spherical coordinates ($\Theta_f$, $\phi_f$) is expressed in terms of the measured pitch and roll angles ($\alpha_m$, $\beta_m$):

$$\Theta_f = \sin^{-1}[\sqrt{\sin^2(\alpha_i + \alpha_m) + \sin^2(\beta_i + \beta_m)}\ ]$$

$$\phi_f = \tan^{-1}\left[\frac{\sin(\alpha_i + \alpha_m)}{\sin(\beta_i + \beta_m)}\right]$$

where $\alpha_i = \sin^{-1}(\sin \Theta_i \sin \Phi_i)$ $\beta_i = \sin^{-1}(\sin \Theta_i \Phi \cos \Phi_i)$ are pitch and roll angles corresponding to an initial is beampointing angle ($\Theta_i$, $\phi$).

10. An apparatus for collecting wind profile data, comprising:
  a radar antenna for generating a radar signal and for receiving a return echo signal;
  means for collecting a radar echo time series from the radar antenna;
  means for measuring pitch and roll angles of the radar antenna during collection of the radar time series;
  means for computing a long term spectrum of wind profile data from the radar time series for use as a first guess of wind profile data;
  means for iteratively computing, from the radar time series, a plurality of short term spectra, shifting the short term spectra based upon the guess of wind profile data and the measured pitch and roll angles, and averaging the plurality of short term spectra to produce a next guess of wind profile data, and iterating using the next guess of wind profile data from a previous iteration until the average short term spectra is minimized; and
  means for storing the average short term spectra as wind profile data corrected for antenna movement.

11. The apparatus of claim 10, wherein individual short-term spectra of the plurality of short term spectra are shifted by an amount (in velocity space):

$\Delta v = v_f - v_i = u(\sin \Theta_f \cos \Phi_f - \sin \Theta_i \cos \Phi_i) + v(\sin \Theta_f \cos \Phi_f - \sin \Theta_i \cos \Phi_i) + w(\cos \Theta_f - \cos \Phi_i)$ where subscripts f and i identify, in spherical coordinates, measured final angle of the antenna and initial beam-pointing angle of the antenna, respectively, and $v_i$ is a long term average radial velocity observed by the beam of interest corresponding to the long term wind spectrum (u, v, w).

12. The apparatus of claim 11, wherein the average antenna pointing angle in spherical coordinates ($\theta_f$, $\phi_f$) is expressed in terms of the measured pitch and roll angles ($\alpha_m$, $\beta_m$):

$$\Theta_f = \sin^{-1}[\sqrt{\sin^2(\alpha_i + \alpha_m) + \sin^2(\beta_i + \beta_m)}\,]$$

$$\phi_f = \tan^{-1}\left[\frac{\sin(\alpha_i + \alpha_m)}{\sin(\beta_i + \beta_m)}\right]$$

where $$\alpha_i = \sin^{-1}(\sin \Theta_i \sin \Phi_i)$$

$$\beta_i = \sin^{-1}(\sin \Theta_i \Phi \cos \Phi_i)$$

are pitch and roll angles corresponding to an initial beam-pointing angle ($\theta_i$, $\phi$).

13. An apparatus for removing buoy motion from wind profiler moment, comprising:

input means for receiving a radar time series from a radar antenna;

antenna position measuring means, coupled to the antenna, for measuring average position and movement of the radar antenna during the radar time series;

long term spectrum calculating means, coupled to said input means, for calculating, from the radar time series, a long term spectrum and first guess wind profile moment;

short term spectra calculating means, coupled to the input means, for calculating, from the radar time series, a plurality of short term spectra;

spectrum shifting means, coupled to the long term spectra calculating means and the antenna position calculating means, for calculating, based upon the first guess and the average antenna position, a number of bins to shift the plurality of short term spectra and for shifting each short term spectra by the number of bins; and spectra averaging means, coupled to the spectrum shifter, for averaging the plurality of short term spectra to produce an averaged short term spectra and calculating wind profile moment from the averaged short term spectra, wherein said spectra averaging means calculates whether the averaged short term spectra is minimized, and outputs the average short term spectra as wind profile moment data corrected for buoy motion.

14. The apparatus of claim 13, wherein individual short-term spectra of the plurality of short term spectra are shifted by an amount (in velocity space):

$$\Delta v = v_f - v_i = u(\sin \Theta_f \cos \Phi_f - \sin \Theta_i \cos \Phi_i) + v(\sin \Theta_f \cos \Phi_f - \sin \Theta_i \cos \Phi_i) + w(\cos \Theta_f - \cos \Phi_i)$$

where subscripts f and i identify, in spherical coordinates, measured final angle of the antenna and initial beam-pointing angle of the antenna, respectively, and $v_i$ is a long term average radial velocity observed by the beam of interest corresponding to the long term wind spectrum (u, v, w).

15. The apparatus of claim 14, wherein the average antenna pointing angle in spherical coordinates ($\theta_f$, $\phi_f$) is expressed in terms of the measured pitch and roll angles ($\alpha_m$, $\beta_m$):

$$\Theta_f = \sin^{-1}[\sqrt{\sin^2(\alpha_i + \alpha_m) + \sin^2(\beta_i + \beta_m)}\,]$$

$$\phi_f = \tan^{-1}\left[\frac{\sin(\alpha_i + \alpha_m)}{\sin(\beta_i + \beta_m)}\right]$$

where $$\alpha_i = \sin^{-1}(\sin \Theta_i \sin \Phi_i)$$

$$\beta_i = \sin^{-1}(\sin \Theta_i \Phi \cos \Phi_i)$$

are pitch and roll angles corresponding to an initial beam-pointing angle ($\theta_i$, $\phi$).

* * * * *